United States Patent [19]

Fukasaku et al.

[11] Patent Number: 4,614,152

[45] Date of Patent: Sep. 30, 1986

[54] AIR INDUCTION SYSTEM FOR AUTOMOTIVE AIR-CONDITIONER

[75] Inventors: Yoshinori Fukasaku, Hitachi; Katsuhiko Hashimoto; Kunihiro Noto, both of Katsuta, all of Japan

[73] Assignee: Hitachi, Ltd., Tokyo, Japan

[21] Appl. No.: 667,755

[22] Filed: Nov. 2, 1984

[30] Foreign Application Priority Data

Nov. 4, 1983 [JP] Japan ............................. 58-207798
Mar. 6, 1984 [JP] Japan ................................ 59-49081

[51] Int. Cl.[4] ............................................. B60H 1/24
[52] U.S. Cl. ...................................... 98/2; 137/625.4; 137/625.44; 251/61; 251/228
[58] Field of Search ............... 98/2, 2.01, 2.05, 2.06, 98/2.07, 2.11; 137/625.4, 625.44; 251/61, 228, 279

[56] References Cited

U.S. PATENT DOCUMENTS 3,845,783  11/1974  De Lepeleire ................... 251/61 X

FOREIGN PATENT DOCUMENTS

| 478536 | 2/1975 | Australia | 98/2.05 |
| 57-107911 | 7/1982 | Japan | 98/2.11 |
| 58-206411 | 12/1983 | Japan | 98/2 |
| 59-18012 | 1/1984 | Japan | 98/2 |
| 2132336 | 7/1984 | United Kingdom | 98/2 |

Primary Examiner—Harold Joyce
Attorney, Agent, or Firm—Antonelli, Terry & Wands

[57] ABSTRACT

An air induction system for an automotive air-conditioner has an air switching housing connected to the suction opening of a blower casing. The housing is provided with a fresh outdoor air induction opening formed in the top wall opposing the suction opening, and a recirculated indoor air induction opening formed in a side wall adjacent to the top wall. An air-switching door is provided for selectively opening and closing the outdoor air induction opening and the indoor air opening. The air-switching door is foldable substantially at its mid portion so that, when the door closes the indoor air induction opening, it is folded to provide a small effective area, while, when it closes the outdoor air induction opening, it is extended to provide a large effective area. The system further has auxiliary indoor air induction openings formed in other side walls and an accordion-type shutter for selectively closing and opening the auxiliary indoor air induction opening. The air switching door and the accordion-type shutter are operatively connected such that, when the door opens the outdoor air induction opening and closes the indoor air opening, the shutter closes the auxiliary indoor air induction openings.

5 Claims, 5 Drawing Figures

4,614,152

AIR INDUCTION SYSTEM FOR AUTOMOTIVE AIR-CONDITIONER

BACKGROUND OF THE INVENTION

1. Field of the Invention

The present invention relates to an air induction system for automotive air-conditioners and, more particularly, to an improved construction of a switching device operative to switch over to or from indoor or recirculated air from or to outdoor or fresh air.

2. Description of the Prior Art

A typical conventional air induction system for automotive air conditioners has, as shown in Japanese Utility Model Publication No. 24566/1982, a box-like intake housing having a fresh-air induction opening and a recirculated-air induction opening which are selectively opened and closed by a single or a pair of dampers or doors. In this air induction system, therefore, the areas of the air induction openings are determined by the area of the door or doors and the width and height of the box-like housing are determined or limited by the arrangement for opening and closing the doors, which determines the overall size of the box-like housing.

SUMMARY OF THE INVENTION

Accordingly, an object of the invention is to reduce the height of the box-like housing without reducing the areas of the fresh-air induction opening and the recirculated-air induction opening.

To this end, according to the invention, an auxiliary opening is formed in a wall of the box-like housing other than the wall in which the openings for fresh air and recirculated air are formed and the auxiliary opening is opened and closed simultaneously with the operation of a door for switching over the fresh-air induction opening and the recirculated-air induction opening.

DESCRIPTION OF THE EMBODIMENT

Figure 1:
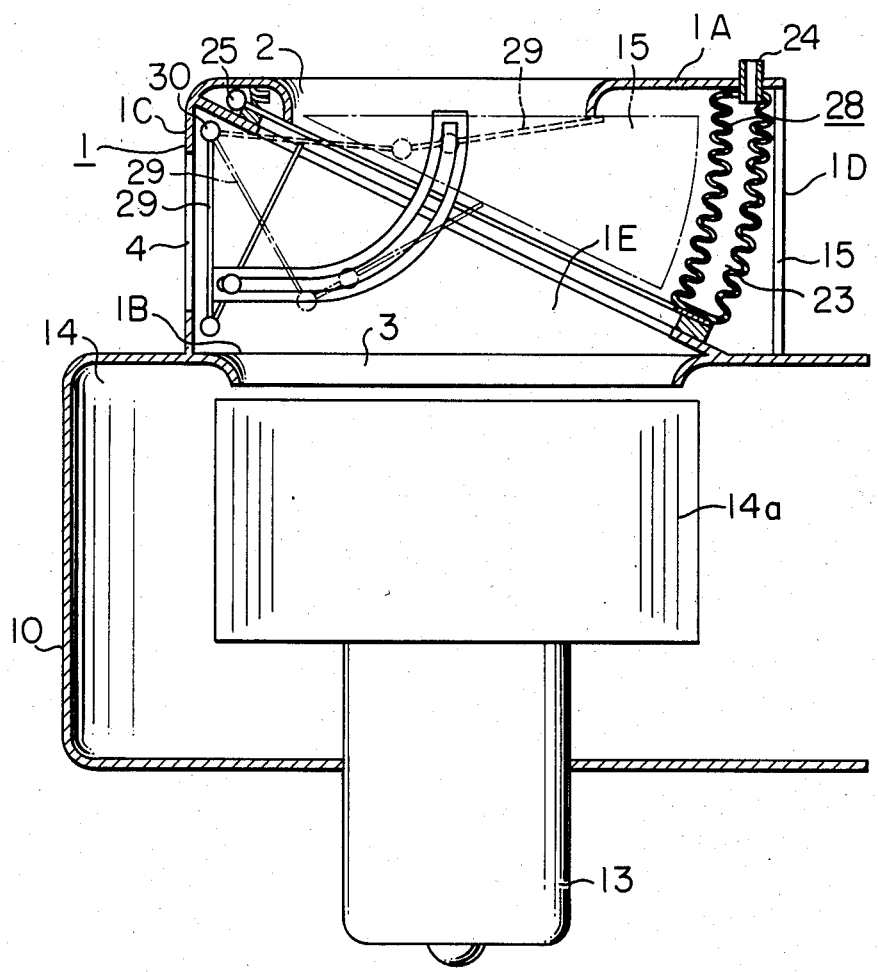
FIG. 1 is a vertical sectional view of an embodiment of an air induction system in accordance with the invention.

Referring to the drawings, an air induction system of the invention includes a box-like housing 1 having a wall 1C in which is formed a main recirculated-air or indoor air induction opening 4. A shaft 30 carrying the base end of a foldable door 29 is rotatably attached to the inner upper end of the wall 1C. The foldable door 29 has a pair of door panels 26 and 27 which are pivotally connected to each other as will be described later in connection with FIG. 3. When the foldable door 29 is folded, i.e., when two door panels are brought together, one 26 of these two door panels closes the main recirculated-air induction opening 4. However, when the foldable door 29 is stretched, i.e., when the door panels 26 are 27 are extended into a substantially planar position, these door panels cooperate to close a fresh-air or outdoor air induction opening 2 formed in the top 1A of the box-like housing 1. The arrangement is such that, when the fresh-air induction opening 2 is closed by the door panels 26 and 27, the main recirculated-air induction opening 4 is opened, whereas, when the main recirculated-air induction opening 4 is closed by the door panel 26, the fresh-air induction passage 2 is opened.

Auxiliary recirculated-air induction openings 15 are formed in the walls 1E and 1F adjacent to the wall 1C having the main recirculated-air induction opening 4 and in the wall 1D opposing the wall 1C.

An accordion-type shutter 28 is pivotally connected at an end through a rotary shaft 25 to the portion of the upper inner surface of the wall 1C. Thus, the accordion-type shutter 28 is designed to selectively open and close at least two of the auxiliary recirculated-air induction openings 15. The details of the accordion-type shutter 28 will be described later.

Figure 3A:
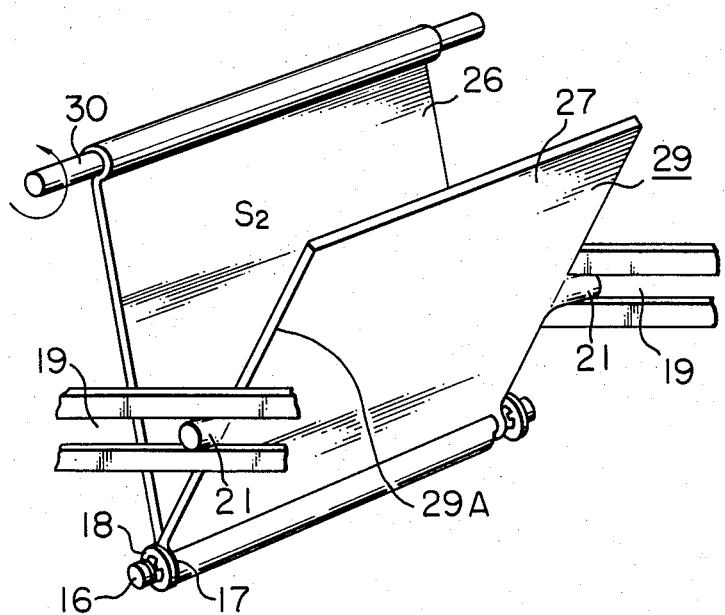
FIGS. 3A and 3B are enlarged illustrations of operation of a foldable door used in the air induction system of the invention.
Figure 3B:
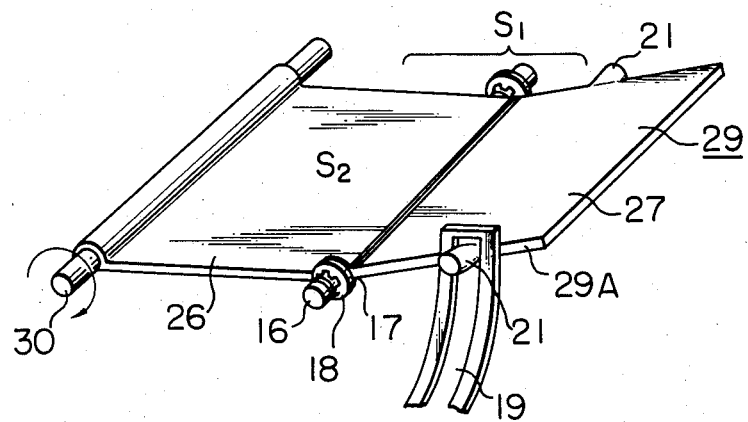
Figure 4:
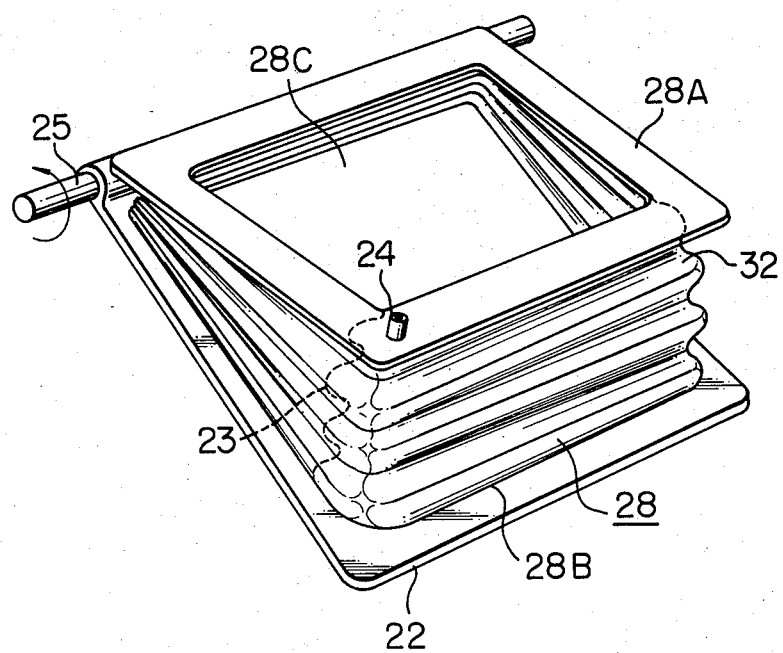
FIG. 4 is an enlarged perspective view of an example of an accordion-type shutter used in the air induction system of the invention.

The foldable door 29 will be described in detail hereinunder with specific reference to FIGS. 3A and 3B. The door 29 is a flap door which is constituted, as mentioned before, by two door panels 26 and 27 pivotally connected to each other. These door panels 26 and 27 have almost equal lengths so that the door 29 can be flexed or folded substantially at the mid portion thereof. More specifically, the end of the door panel 26 remote from the rotary shaft 30 is provided at its both lateral sides with pegs 16, while the adjacent end of the door panel 27 is provided with eyes 17 which rotatably engage the pegs 16. The eyes 17 are retained on the pegs 16 by E rings 18. Pegs 21 project from both lateral side edges of the door panel 27 and are received in grooves 19 formed in rails disposed adjacent to the inner surfaces of both walls 1E and 1F disposed at both sides of the door panel 27. The arrangement is such that, when the door panel 26 is swung about the axis of the shaft 30, the pegs 21 on the door panel 27 slide along the grooves 19 in the rails. The rails are so curved that, when the door panel 26 has been swung away from the wall 1C to a position substantially perpendicular thereto, both door panels 26 and 27 are extended substantially linearly to provide a substantially flat wall of a large area $S_1$ to fully close the fresh-air induction opening 2. The foldable door 29 can be folded to provide a small area $S_2$ when it is swung to the position for closing the main recirculated-air induction opening 4.

The accordion-type shutter 28 for selectively closing the auxiliary recirculated-air induction openings 15 has a flat plate or frame 22 connected to the shaft 25 and made of a comparatively rigid material such as an iron or a hard resin, and a double-walled accordion-like partition 32 sealingly securd at its lower end 28B to the upper surface of the flat frame 22. The partition 32 is formed of a flexible elastomeric material such as rubber or a soft plastic material. The upper end 28A of the accordion-like partition 32 is sealingly secured to the inner surface of the top wall 1A of the box-like housing 1. The arrangement is such that the frame 22 of the accordion-type shutter 28 is swingable about the axis of the shaft 25 up and down between an upper position in which the shutter is folded into a substantially flat position and a lower or stretched position in which the shutter 28 as a whole exhibits a substantial triangular side elevation, as viewed in FIG. 1. When the frame 22 is in the upper position, the accordion-type shutter 28 opens the auxiliary recirculated-air induction openings 15 whereas, when the frame 22 is in the lower position, the shutter 28 covers and closes the auxiliary recirculated-air induction openings 15.

An aperture or passage 28C of an area greater than that of the foldable door 29 is defined by the accordion-like partition 32 and the flat frame 22 to provide a fluid-flow communication between the fresh-air induction opening 2 and a suction opening 3 formed in the top of a blower housing 14 in which a fan 14a is provided so as to be driven by a motor 13. A portion of the accordion-like partition is double-walled to form a pressure chamber or pneumatic actuator 23 which is communicated with a vacuum source (not shown) through a pipe 24 projecting upwardly from the upper end 28A of the accordion-type partition 28. The arrangement is such that a vacuum or atmospheric pressure is selectively introduced into the actuator 23 via the pipe 24 through a solenoid valve which may be of the type disclosed in Japanese Patent Publication No. 70807/1981.

In the illustrated embodiment of the invention, the actuator 23 is so formed as to possess a resiliency which, when the atmospheric pressure is introduced into the actuator, expands the actuator to the position shown in FIG. 1 in which the accordion-type shutter 28 closes the auxiliary recirculated-air induction openings 15 formed in the side walls 1D, 1E and 1F of the box-like housing 1. However, a spring member or members may also be used to keep the shutter 28 closed when vacuum is not introduced into the actuator 23.

Figure 2:
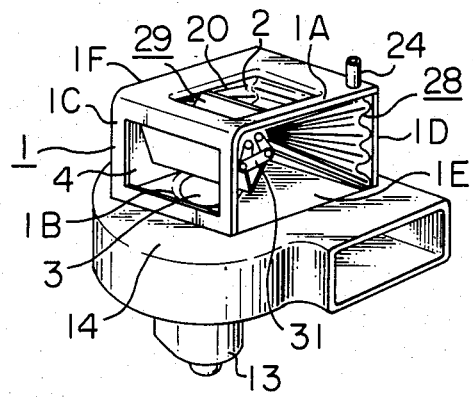
FIG. 2 is a perspective view of the whole of the air induction system shown in FIG. 1.

Referring to FIG. 2, the rotary shaft 25 of the accordion-type shutter 28 and the rotary shaft 30 of the foldable door 29 are operatively connected by a link mechanism 31 so that the foldable door 29 can be operated in relation to the operation of the accordion-type shutter 28 when the same is actuated by vacuum or atmospheric pressure introduced into the actuator 23. This arrangement, however, is not exclusive. For instance, it is possible to arrange such that the rotary shaft 30 of the foldable door 29 is driven by a suitable power source to drive the accordion-type shutter 28 through the link mechanism 31. In such a case, the actuator 23 can be omitted. It is also possible to drive the shafts 25 and 30 by independent power sources. In this case, the link mechanism 31 is unnecessary.

In operation, for inducing fresh air, the foldable door 29 is folded such that both door panels 26 and 27 are superposed to each other so that the main recirculated-air induction opening 4 is closed by the door panel 26 and the fresh-air induction opening 2 is opened, while the auxiliary recirculated-air induction openings 15 formed in the walls 1D, 1E and 1F are blocked by the accordion-type shutter 28 which, at this time, is stretched. Therefore, fresh air is sucked at a high rate from the fresh-air induction opening 2 through the aperture 28C in the accordion-type shutter 28.

For inducing recirculated or indoor air, the actuator 23 is pneumatically operated to contract the accordion-like partition 32 for thereby opening all the auxiliary recirculated-air induction openings 15. At this time, the foldable door 29 is moved to a position in which the door panels 26 and 27 are stretched to provide a substantially planar continuous wall to close the fresh-air induction opening 2, while opening the main recirculated-air induction opening 4. In consequence, the recirculated or indoor air is induced at a high rate through the induction openings 4 and 15, while the fresh air is blocked by the foldable door 29.

The described embodiment of the air-induction system for automotive air-conditioner has a foldable door and an accordion-type shutter operatively connected to each other such that the door can be moved to selectively open and close the main recirculated-air induction opening and the fresh-air induction opening simultaneously with the movement of the accordion-type shutter which selectively opens and closes the auxiliary recirculated-air induction openings. With this arrangement, it is not necessary to use a separate actuator for the door, so that the size and the weight of the air-induction system can be decreased without lowering the performance of the automotive air-conditioner. In addition, the combined use of the foldable door and the accordion-type shutter is effective to reduce the height of the box-like housing 1 of the air-induction system without reducing the areas of the air induction openings and thus the flow-rate of the air, so that the space is saved to improve the comfort in the occupant compartment of the automobile. The reduction in the size and weight in turn permits a standardization of the air-induction system to increase the applicability of the system to a variety of classes of automobiles.

What is claimed is:

1. An air induction system for an automotive air-conditioner, including:
    a box-like housing disposed upstream of a blower of the air-conditioner and provided with a recirculated indoor air induction opening and a fresh outdoor air induction opening and with an air switching door means adapted to selectively open and close said indoor air induction opening and said outdoor air induction opening;
    an accordion-type shutter means operatively associated with said air switching door means so as to be expanded and contracted, respectively, when said air switching door means is moved to a position for opening said outdoor air induction opening and when said air switching door means is moved to a position for opening said indoor air induction opening;
    said housing being further provided with at least one auxiliary indoor air induction opening formed in a portion of said housing means adjacent to said accordion-type shutter means; and
    said shutter means and said auxiliary indoor air induction opening being arranged such that said auxiliary indoor air induction opening is closed when said shutter means is expanded, and said auxiliary indoor air induction opening is opened when said shutter means is contracted.

2. An air induction system for an automotive air-conditioner including a box-like housing disposed upstream of a blower of the air-conditioner and provided with an indoor air induction opening and an outdoor air induction opening, wherein at least a part of said housing is formed by an accordion-type shutter means expansible to a closed position in which said shutter means closes said indoor air induction opening, said shutter means being contractible to an open position in which said shutter means opens said indoor air induction opening, a flap door is provided to selectively open and close said outdoor air induction opening, said flap door being drivingly connected to said shutter means such that, when said flap door is moved to the position for closing said outdoor air induction opening, said shutter means is contracted to said open position, and, when said flap door is moved to a position for opening said outdoor air induction opening, said shutter means is expanded to said closed position.

3. An air induction system for an automotive air-conditioner according to claim 1, wherein at least a portion of said shutter means has a double-walled structure defining a closed chamber, said air induction system further including a controlling means adapted to introduce vacuum into said chamber when said indoor air induction opening is opened and to introduce atmospheric pressure into said chamber when said outdoor air induction opening is opened.

4. An air induction system for an automotive air-conditioner according to claim 2, wherein at least a portion of said shutter means has a double-walled structure defining a closed chamber, said air induction system further including a controlling means adapted to introduce vacuum into said chamber when said indoor air induction opening is opened and to introduce atmospheric pressure into said chamber when said outdoor air induction opening is opened.

5. An air induction system for an automotive air-conditioner, including a box-like housing disposed upstream of a blower of the air conditioner and provided with a recirculated indoor air induction opening and a fresh outdoor air induction opening and with an air switching door supported by said housing and adapted to selectively open and close said indoor air induction opening and said outdoor air induction opening, said air switching door having door panels pivotally connected to each other so that said door is foldable substantially at a mid portion thereof, said door being adapted to be folded to reduce its effective area when said door closes said indoor air induction opening and adapted to be extended to increase its effective area when said door closes said outdoor air induction opening, said indoor air induction opening having an area corresponding to the effective area of said door when in the folded position, said outdoor air induction opening having an area corresponding to the effective area of said door when in the extended position, said housing being further provided with at least one additional opening formed in the wall of said housing means other than the walls having said indoor air induction opening and said outdoor air induction opening; said air induction system further including a shutter means operative such that, when said door is in the extended position, said shutter means opens said additional opening and, when said door is in the folded position, said shutter means closes said additional opening.

* * * * *